United States Patent
Roodenburg et al.

(10) Patent No.: US 7,914,384 B2
(45) Date of Patent: Mar. 29, 2011

(54) AMUSEMENT DEVICE

(75) Inventors: Joop Roodenburg, Delft (NL); Johan Willem Philippen, Schinveld (NL)

(73) Assignee: Vekoma Rides Engineering B.V., Vlodrop (NL)

( * ) Notice: Subject to any disclaimer, the term of this patent is extended or adjusted under 35 U.S.C. 154(b) by 618 days.

(21) Appl. No.: 11/984,028

(22) Filed: Nov. 13, 2007

(65) Prior Publication Data
US 2008/0143158 A1    Jun. 19, 2008

Related U.S. Application Data

(63) Continuation-in-part of application No. PCT/EP2006/004562, filed on May 15, 2006.

(30) Foreign Application Priority Data

May 13, 2005    (EP) .................................... 05076134

(51) Int. Cl.
*A63G 1/34* (2006.01)
*B61B 3/00* (2006.01)
(52) U.S. Cl. .......................................... 472/43; 104/63
(58) Field of Classification Search .............. 472/43–47, 472/58–60, 130, 133; 297/475, 476, 484
See application file for complete search history.

(56) References Cited

U.S. PATENT DOCUMENTS

| | | | |
|---|---|---|---|
| 4,186,962 A | | 2/1980 | Meeker |
| 4,770,468 A | | 9/1988 | Shubin |
| 5,272,984 A | * | 12/1993 | Bolliger et al. ................ 104/63 |
| 5,779,319 A | | 7/1998 | Merrick |
| 6,348,004 B1 | * | 2/2002 | Houben ......................... 472/43 |
| 6,431,989 B1 | | 8/2002 | Katayama et al. |
| 2003/0085608 A1 | | 5/2003 | Girardin |

* cited by examiner

*Primary Examiner* — Kien T Nguyen
(74) *Attorney, Agent, or Firm* — Birch Stewart Kolasch & Birch, LLP (57) ABSTRACT

An amusement device has an elongated track along which one or more amusement device seat assemblies adapted to carry the one or more passengers are moveable. Each seat assembly has a seat with a seating surface and a back support with a back support surface. The seat assembly further includes a bar construction attached to a pivot mechanism. This bar construction has a hip bar and one or more pivot arms integral with the hip bar, which bar construction is pivotable about the pivot axis from a raised position in which the hip bar is raised from the seating surface to allow a passenger to sit down in the amusement device seat assembly, to a lowered position. No part of the bar construction takes away the view of the person and limits the movements of the arms of the person, allowing the passenger to experience a great sense of freedom.

19 Claims, 8 Drawing Sheets

AMUSEMENT DEVICE

FIELD OF THE INVENTION

The invention relates to an amusement device that provides a sense of excitement for the one or more passengers. The amusement device includes a track, and can be equipped with a station for boarding and/or disembarking of the passengers. The track can be an endless track including one or more curves and possibly also including one or more of inclined sections, loopings, corkscrews, etc, along which one or more amusement device seat assemblies adapted to carry the one or more passengers are moveable. The motion along the track can be gravity induced and/or caused by one or more suitable drive means as is known in the art. In a preferred embodiment the amusement device is a rollercoaster, e.g. a suspended rollercoaster or a regular rollercoaster wherein the seats are positioned above the track.

BACKGROUND OF THE INVENTION

Amusement devices having seat assemblies for the passengers are well known from the art and applied in many amusement devices such as roller coasters, both in fairgrounds and in amusement parks.

An example of an amusement device with seat assembly is shown in US 2003/0024428. In this prior art device a seat has an associated pivotable hip bar construction which includes two spaced apart pivot arms and a hip bar fastened at the lower end of the pivot arms. In the lowered position the pivot arms are located in front of the passenger's head, which have the effect of a cage. This is to the detriment of the sense of excitement of the passenger.

A further example is shown in U.S. Pat. No. 6,733,398. Here the seat is provided with shoulder straps that each extend from an associated anchoring point on the backrest to a belt tensioner at the respective side of the seat. A pivotable hip bar construction includes a hip bar element and a central pivotable rod supporting said hip bar element. This pivotable rod is pivoted to a foot rest platform below the seat. This seat assembly is disadvantageous in view of the speed and comfort of boarding and disembarking of the passengers. Also the design requires a foot rest platform which is reduces the sense of freedom of the passengers and thus the thrill of the ride.

OBJECT OF THE INVENTION

The object of the invention is to provide an improved amusement device, with which an enhanced sense of excitement is provided.

SUMMARY OF THE INVENTION

The invention provides an amusement device, in particular a roller coaster, for providing a sense of excitement to one or more passengers using the amusement device, wherein each passenger seat assembly of the device comprises:

(a) a seat for the passenger, comprising a seating surface and a back support with a back support surface;

(b) a frame comprising track engagement means, e.g. rollers, and the frame supporting the seat, the frame further comprising a pivot mechanism providing a pivot axis extending behind the back support surface at a distance above the seating surface, which pivot axis is substantially parallel to the back support and substantially parallel to the seating surface;

(c) a bar construction attached to the pivot mechanism comprising a hip bar and one or more pivot arms integral with the hip bar, which bar construction is pivotable about the pivot axis from a raised position in which the hip bar is raised from the seating surface to allow a passenger to sit down in the amusement device seat assembly, to a lowered position, in which:

the hip bar is in the vicinity of the seating surface, so as to extend across the hip over the lap of a passenger seated in the amusement device seat assembly, at least part of the pivot arm is located behind an imaginary plane that extends tangent and substantially parallel with the back support surface, such that no part of the bar construction takes away the view of the person and limits the movements of the arms of the person, allowing the passenger to experience a great sense of freedom, (d) a belt construction comprising at least two shoulder straps of which the lower end is connected to the bar construction, and further comprising an adjustable length mechanism associated with each shoulder strap to allow for adaptation of the length of the shoulder straps to the size of the passenger in the lowered position of the bar construction such that the shoulder straps are in physical contact with the shoulders and upper part of the body of a passenger seated in the amusement device seat assembly so as to increase the sense of safety of the passenger.

Preferably a seat assembly includes a single passenger seat and associated bar construction for said single passenger, so that each passenger is secured independently of other passengers in other seats.

The bar construction enables the operator of the amusement device to easily secure each passenger in its seat and allows to check whether everyone is secured safely.

The bar construction further provides a robust connection for the belt construction, making small loose parts unnecessary.

In case the bar construction includes two pivot arms—as is preferred—, each at a side of the seat, the mutual distance between the pivot arms should be such that the pivot arms easily pass the one or more passengers and the back support when lowering and raising the bar construction.

The safety of the person seated in the amusement device seat assembly is enhanced by the belt construction and in particular by the adjustable length mechanism thereof.

The combination of the inventive bar construction and belt construction allows a person seated in the seat to experience a great sense of freedom, since no part of the bar construction or belt construction takes away the view of the person, and movements of the arms of the person are not restricted.

Preferably, the lower part of the shoulder straps is connected to the hip bar.

Preferably, the adjustable length mechanism comprises a spring mechanism, e.g. a torsion spring, as is used in safety belts in cars, connected to the upper end or the lower end of shoulder straps, such that the length of the shoulder straps between the connection point of the spring mechanism and the connection point of the lower or upper end of the shoulder strap at the bar construction is variable.

The spring mechanism is preferably connected to the frame, but is alternatively connected to the back support of the seat or alternatively to the bar construction, in particular to the hip bar.

Preferably, the spring force is such that the shoulder straps are in physical contact with the shoulders and upper part of the body of a passenger seated in the amusement device seat assembly so as to secure the passenger in the seat and to increase the sense of safety of the passenger.

The adjustable length mechanism allows passengers of with a suitable range of sizes to be comfortable and safely seated in the amusement device according to the invention.

Alternatively, the adjustable length mechanism of the belt construction is provided in an intermediate portion of the shoulder straps by providing a compressible section of the shoulder straps.

In a preferred embodiment, a single padded foam body harness is provided over or around the two shoulder straps. Possibly a harness is provided which extends also in the area between the shoulder straps, over the torso of the person seated in the seat. This harness is preferably attached to the bar construction, or alternatively only connected to the belt construction.

In a preferred embodiment of an amusement device seat assembly according to the invention, the connection of the belt construction or the spring mechanism with the back support or with the frame is adjustable in height, so that the upper position of the shoulder straps has a variable height. This type of amusement device seat assembly will make amusement devices suitable for use by persons of different length, in particular children and adults.

In a preferred embodiment, the back support of the seat is provided with a lumbar support. This will fix the passenger more firmly into the seat and will increase the sense of safety of the passenger.

According to the invention, one or more amusement device seat assemblies are movable along an elongated track. In a possible embodiment, a carrier comprising one or more amusement device seat assemblies is movable along the elongated track.

In a preferred embodiment, the amusement device seat assemblies or a carrier comprising one or more amusement device seat assemblies is suspended below the track.

Preferably the amusement device seat assemblies are suspended below the track and a support for the lower legs and feet is absent so that the passengers lower legs and feet are freely suspended to enhance the sense of excitement.

Preferably, multiple seat assemblies are moveable along the track of the amusement device according to the invention.

In a preferred embodiment, the seat assembly comprises a single frame with one pivot axis to which two pivot arms are attached and one hip bar, between which pivot arms multiple seats and multiple belt constructions are provided.

Preferably, each seat has an associated belt construction.

The invention will be explained in more detail with reference to the drawing.

DETAILED DESCRIPTION OF PREFERRED EMBODIMENTS

Figure 1A:
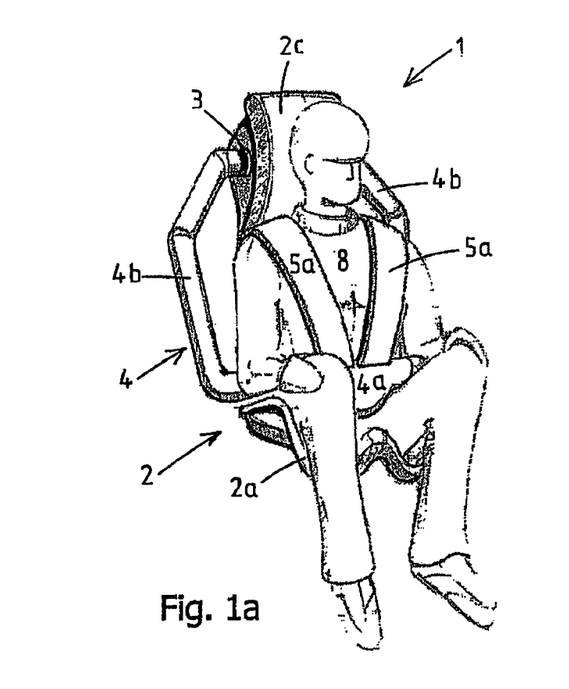
FIG. 1a shows a perspective view of a first embodiment of a seat assembly of an amusement device according to the invention.
Figure 1B:
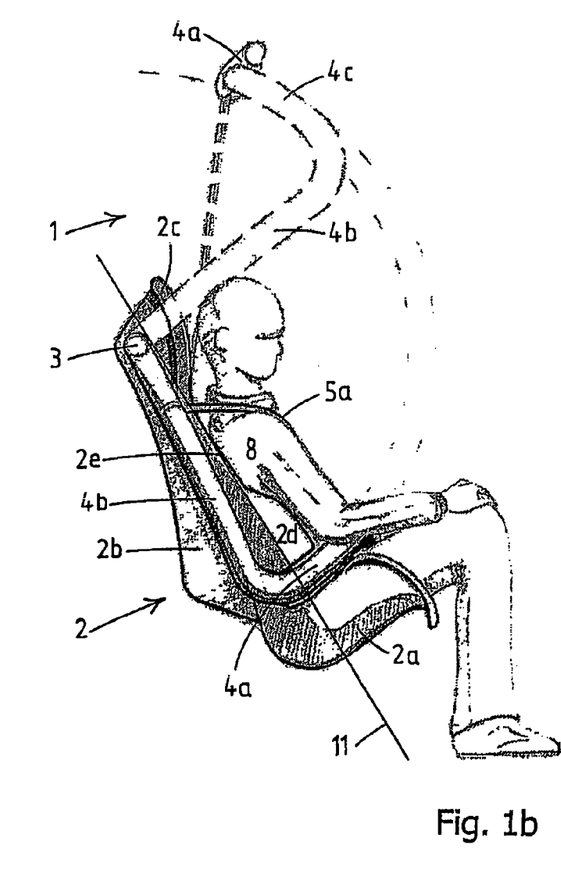
FIG. 1b shows a side elevational view of the embodiment according to FIG. 1a, FIG. 2a shows a perspective view of a second embodiment of a seat assembly of an amusement device according to the invention.

FIG. 1a shows a person 8 sitting in the amusement device seat assembly 1 with a bar construction 4 in a lowered position. FIG. 1b shows a side view of the person 8 sitting in the amusement device seat assembly 1 in a lowered position of the bar construction 4. The bar construction has a raised position which is illustrated in dashed lines.

The amusement device seat assembly 1 comprises a seat 2, capable of accommodating a person 8. The seat 2 comprises a seating surface 2a and a back support 2b with a back support surface 2e. The back support surface is the surface of the back support 2b against which the back of the person 8 sitting in the amusement device seat assembly 1 rests. The back support 2b is possibly provided with small curvatures to improve the comfort of the person 8. The seating surface 2a of this embodiment has a shape adapted to the legs of the person such that the legs are well supported and thus positioned comfortably. The seat 2 further comprises a headrest 2c and a lumbar support 2d. In a preferred embodiment, the seat 2 is produced in one piece, for example by mould casting.

The seat assembly further comprises a frame 9 supporting the seat, comprising track engagement means which are not shown in FIGS. 1 and 2. The frame comprises a pivot mechanism providing a pivot axis 3 extending in the vicinity of the back support 2b, behind the headrest 2c, at a distance above the seating surface. The pivot axis 3 is substantially parallel to the back support 2b and substantially parallel to the seating surface 2a. In this embodiment, the pivot axis extends behind the back support, in an upper part above the middle thereof.

The amusement device seat assembly 1 further comprises a bar construction 4. The bar construction 4 comprises a hip bar 4a and two pivot arms 4b integral with the hip bar 4a. The pivot arms 4b extend substantially perpendicular from the pivot axis 3 to the hip bar 4a. The hip bar 4a extends substantially perpendicular from the pivot arms and substantially parallel to the pivot axis. The pivot arms 4b could be of any material, for example aluminium. The hip bar 4a is preferably padded for the comfort of the person in the amusement device seat assembly 1. The bar construction 4 is of a curved construction. Possibly it is made from multiple sections including angles, for example produced by welding but also in one piece by bending. The pivot arm 4b and the hip bar 4a are preferably produced in one piece together, but are alternatively formed from two or more connected sections. In the shown embodiment, the pivot arm is constructed in a single plane, as is visible from the side view of FIG. 1b. The hip bar 4a extends transversely with respect to this plane, over the seating surface in the lowered position, over the lap of a person 8 seated in the amusement device seat assembly 1. The bar construction 4 is pivotable about the pivot axis 3.

In a raised position, shown in dashed lines in FIG. 1b, the hip bar 4a is remote from the seating surface 2a and the pivot arms 4b are extending upwards. The amusement device seat assembly is fixed in this raised position, for example in a boarding station of an amusement device, allowing a passenger to enter and sit down onto the seat 2. Preferably, the seating surface 2a of the seat 2 is approximately horizontal in the boarding station, and the back support 2b is approximately vertical or at a slight angle increasing the comfort of the passenger. This is the most comfortable way of entering the amusement device seat assembly. Along other parts of the track of the amusement device, it is not necessary for the seating surface 2a to be approximately horizontal.

In the embodiment of FIG. 1, a belt construction 5 comprising two shoulder straps 5a is connected to the back support 2b and to the hip bar 4a. In a not shown embodiment the straps 5a could also be connected to the pivot arm 4b, similar to the assembly shown in US 2003/0024428. The shown shoulder straps are padded. The belt construction 5 further comprises an adjustable length mechanism (not shown) to allow for adaptation of the length of the shoulder straps to the size of the passenger.

In operation, the bar construction is pivoted to the raised position, shown in dashed lines in FIG. 1b, to allow passengers to enter and sit down onto the seat 2. In the raised position the hip bar and the belt construction are no obstruction to sit down on the seat. When all passengers have entered the amusement device seat assemblies present in the amusement device, the bar construction 4 is pivoted to a lowered position. For this purpose, preferably an automatic raising and lowering mechanism and a fixing mechanism (not shown) is provided for each amusement device seat assembly. For example, a pneumatic raising and lowering mechanism is provided, in combination with a pneumatic fixing mechanism.

In the lowered position, shown in FIG. 1a and in 1b in solid lines, the hip bar is in the vicinity of the seating surface, extending over the lap and in front of the hips and the belly of a person 8 seated in the amusement device seat assembly 1. The shoulder straps 5a extend across the shoulders and upper part of the body of a person 8 seated in the amusement device seat assembly 1. According to the invention, the adjustable length mechanism of the belt construction has adapted the length of the shoulder straps such that the shoulder straps are in physical contact with the shoulders and upper part of the body of a passenger seated in the amusement device seat assembly so as to increase the sense of safety of the passenger. In the shown embodiment, the mutual distance between the pivot arms is suitable for accommodating a seat for one person between the pivot arms 4b. As a result of this mutual distance, the pivot arms 4b easily pass the passenger 8 and the back support 2b when lowering or raising the bar construction 4. The hip bar 4a extends between the ends of the pivot arms 4b, opposite from the pivot axis 3. The hip bar 4a extends across the lumbar support 2d of the seat 2. This hip bar 4a is, still in the lowered position, located close to the seating surface 2a. When a person 8 is seated in the seat 2, the hip bar 4a extends in the vicinity of the elbow and the forearm of the person 8. According to the invention, the pivot arms 4b are behind an imaginary plane defined as a substantially flat tangent plane that extends behind the back of the person, through the back support 2b, as is illustrated in FIG. 1b, indicated by reference numeral 11. Hence, the pivot arms 4b are located behind the shoulders of the person 8 and therefore, the arms of the person will be free to move. This contrary to the embodiment according to the state of the art, shown in US 2004/0024428, in which the pivot arms extend over the shoulder and upper arm part of the person. It is conceivable to design an embodiment in which in the lowered position not the entire pivot arm is located behind this imaginary plane. What is meant by this invention is that the part of the pivot arm that, in the lowered position of the bar construction, is at the level of the upper body part and the head of the person seated in the seat assembly is located behind this imaginary plane.

Figure 2A:
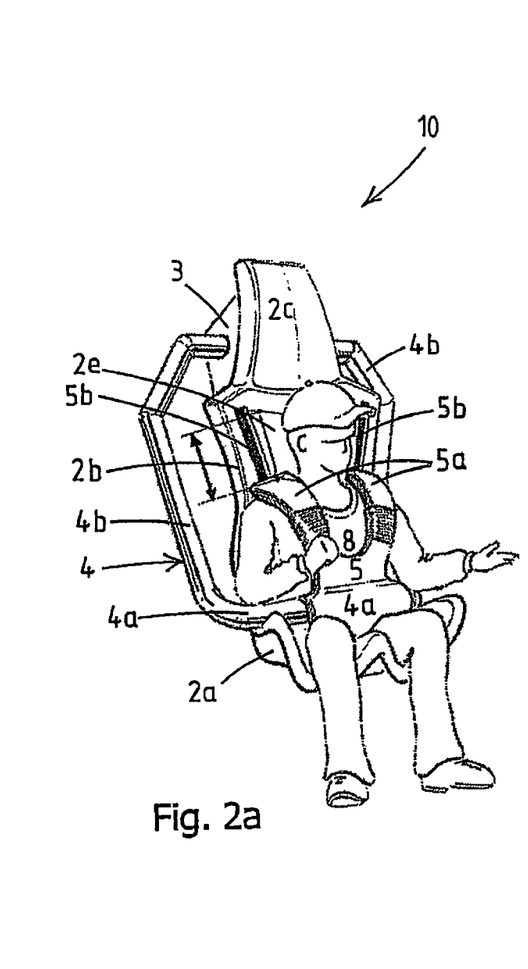
Figure 2B:
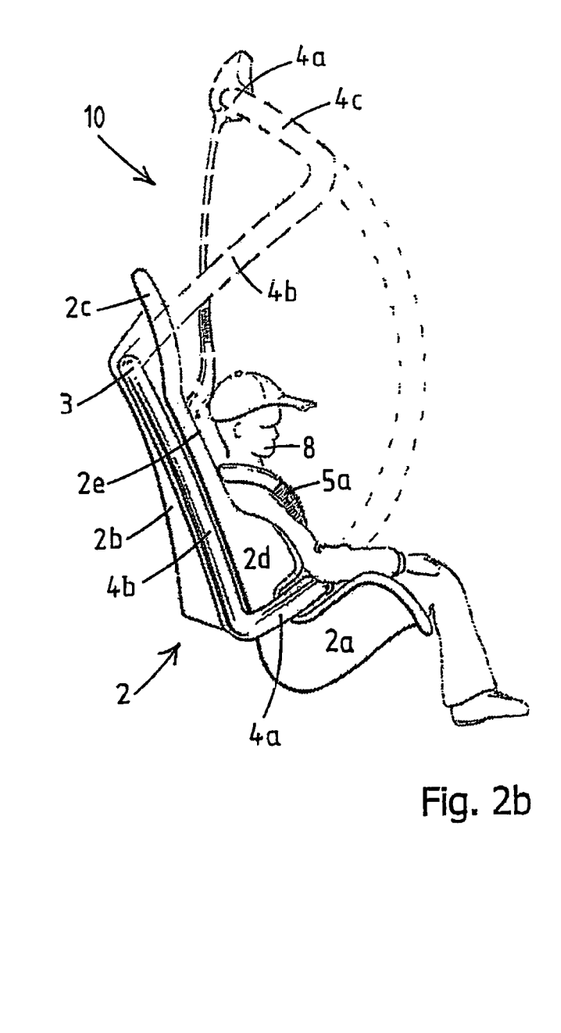
FIG. 2b shows a side elevational view of the embodiment according to FIG. 2a, FIG. 3 shows a perspective view, partly in cross-section of a third embodiment of a seat assembly of an amusement device according to the invention.

FIGS. 2a and 2b show a second embodiment of an amusement device seat assembly 10 according to the invention. Similar parts are indicated with similar numbers as in FIGS. 1a and 1b, to which 10 has been added. FIG. 2a indicates a perspective view of the amusement device seat assembly 10. FIG. 2b shows a side view in dashed lines indicated a raised position of the bar construction 14 and in straight lines a lowered position of the bar construction. In the embodiment shown in FIGS. 2a and 2b, an adjustable connection of the belt construction 15 with the back support 12b is visible, designed as a slidable anchorage 15b. With this adjustable connection 15b the belt construction 15 is connectable to the back support 12b in multiple positions varying height. This is in particular beneficial when the amusement device seat assembly 10 should be capable of fixing persons with different length, in particular adults and children in the seat 12, such as the person 18 shown in FIGS. 2a and 2b. In a possible embodiment, the adjustable connection is manually operable mechanism, which is to be adjusted by an amusement device operator or by the passenger himself. In an improved embodiment, the adjustable connection is an electrically operable mechanism, provided with a sensor that determines whether or not the connection should be lowered or not.

In an alternative embodiment, the seating surface accommodating a person has the shape of a saddle, e.g. as a bicycle saddle. This allows to incorporate the seat assembly in amusement devices which provide another sense of experience of the ride, possibly in a standing position as in a stand-up coaster. It is possible to provide a latch mechanism between the hip bar and the seat or saddle to fix the bar construction.

The belt construction 15 comprises two shoulder belts 15a, over which a single padded foam body harness is provided. With such a construction, the straps will not irritate the shoulders of the passenger. When adjusting the height of the belt construction at the back support, the length of the shoulder straps and the padded harness is adapted such that it is compacted for shorter persons via an adjustable length mechanism 15c, e.g. by including a compressible section, e.g. with predefined folding lines as in FIGS. 2a, b.

Figure 3:
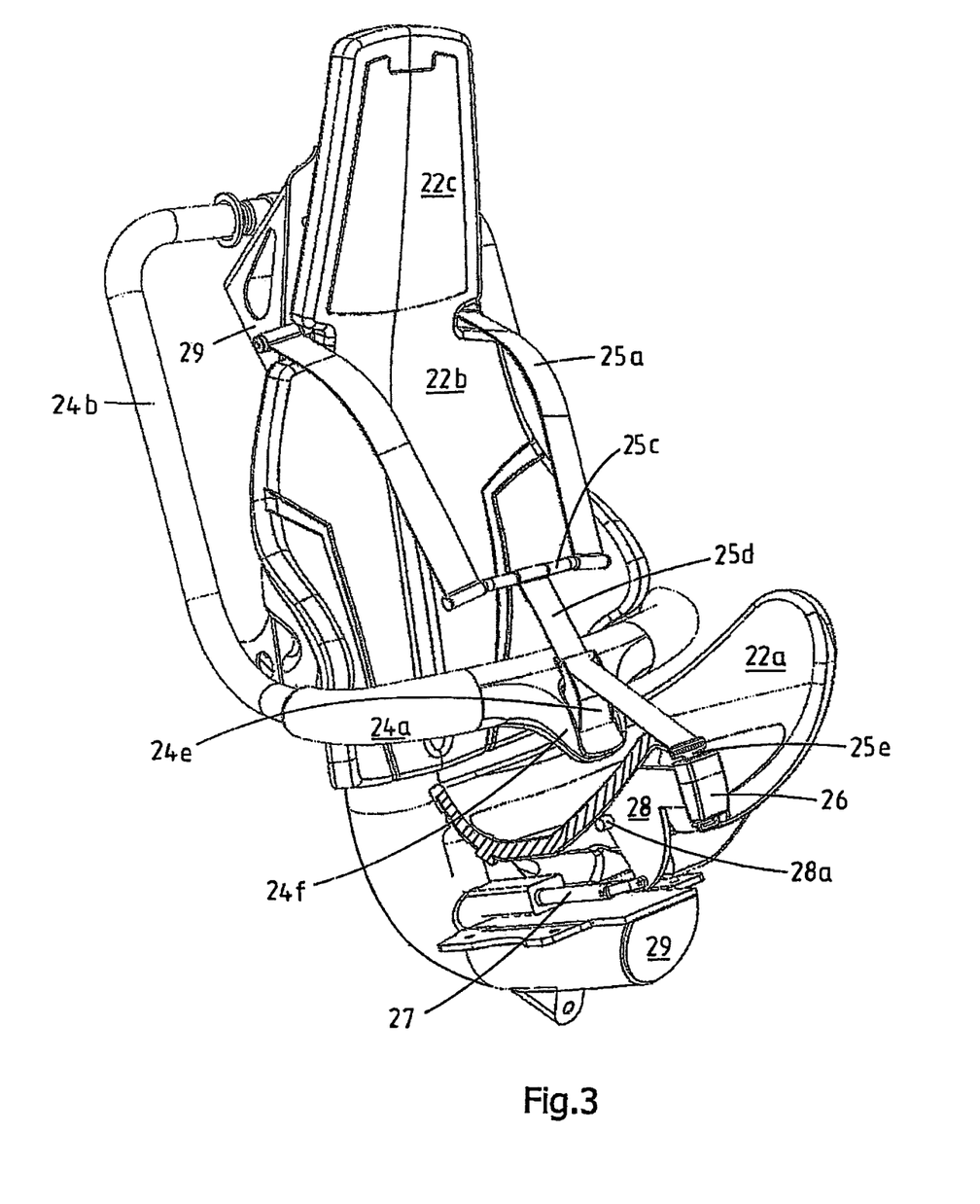

In a further advanced version, as shown in FIG. 3, the shoulder straps 25a of the belt are anchored to the frame 29 behind the back support 22b (in this example at a fixed position) and the lower ends of the straps 25a are connected to a connecting member 25c. From said member 25c a lower belt strap 25d extends to and through a guide member 24e on the hip bar. Below said guide member 24e the strap 25d is provided with a locking member 25e.

The seat 22 shown in this embodiment is provided with a lock 26 to which said locking member 25e is fixed when the passenger is seated. Thus in this arrangement the belt as it where extends through the hip bar.

In normal use the passenger will be seated on the seat, then the bar construction is lowered (automatically if desired). The passenger has then to grip the locking member 25e, which is then at a central position on the hip bar, and connect it to the lock 26.

According to the invention, and shown in FIG. 3, the lock 26 to which the lower end of the belt is fastened, is arranged in a mobile manner to allow for adjusting the length of the belt (tensioning of the belt). In this example the adjustable length mechanism is associated with lock 26 and comprises a (pneumatic) lock displacement mechanism, preferably arranged below the seat (shown here partly in cross-section). Here the lock displacement mechanism includes a pneumatic cylinder 27. In this example the cylinder causes the pivoting of pivotable member 28 about a horizontal axis 28a. The lock 26 is also fastened on said pivotable member 28.

In the drawings—as is preferred—the hip bar 24a is centrally provided with a spacer member 24f extending downwards. This member 24f extends in lowered position of the bar construction between the thighs of the passenger which provides enhanced security.

Figure 4A:
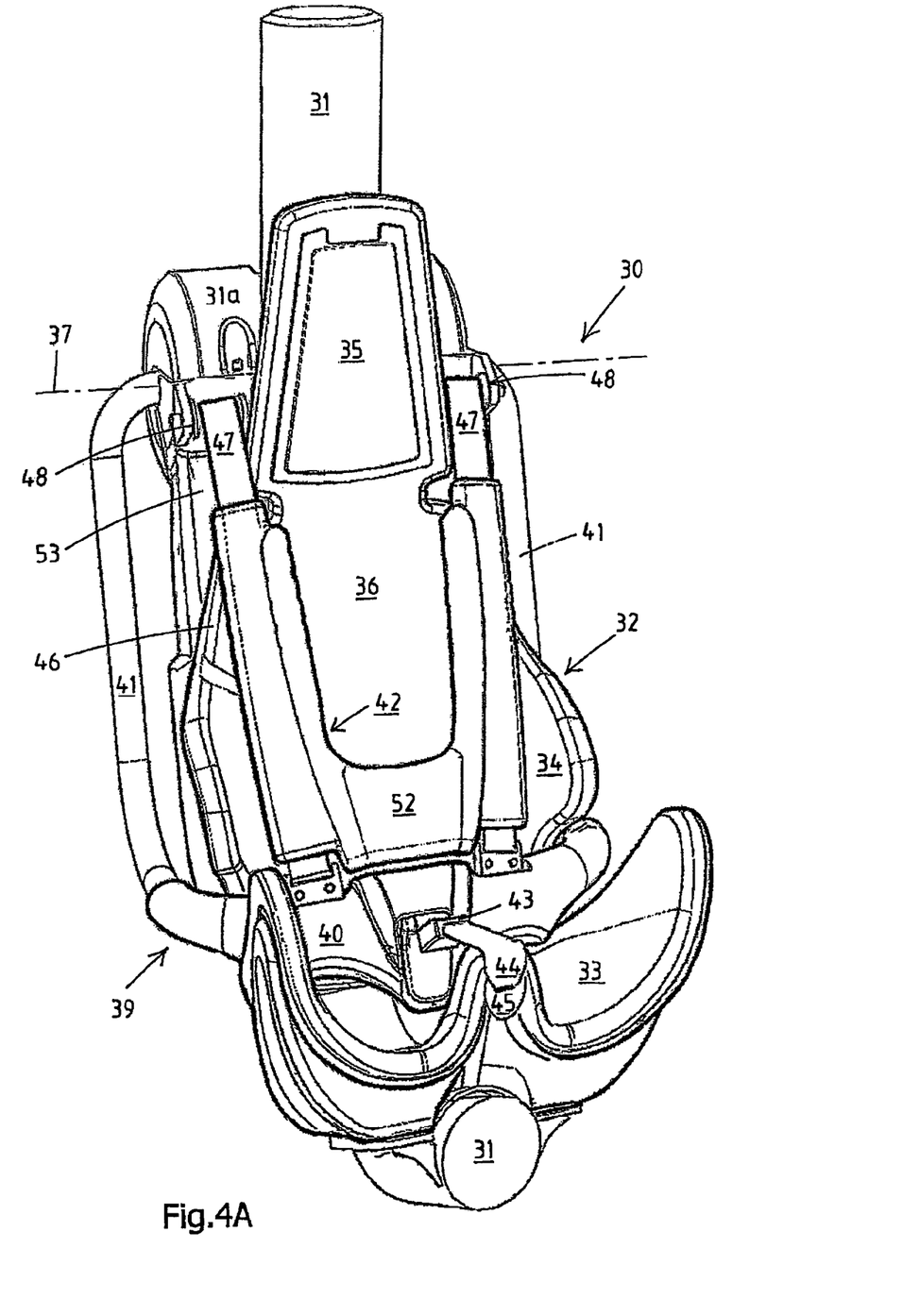
FIG. 4a shows a front perspective view of a fourth embodiment of a seat assembly of an amusement device according to the invention.
Figure 4B:
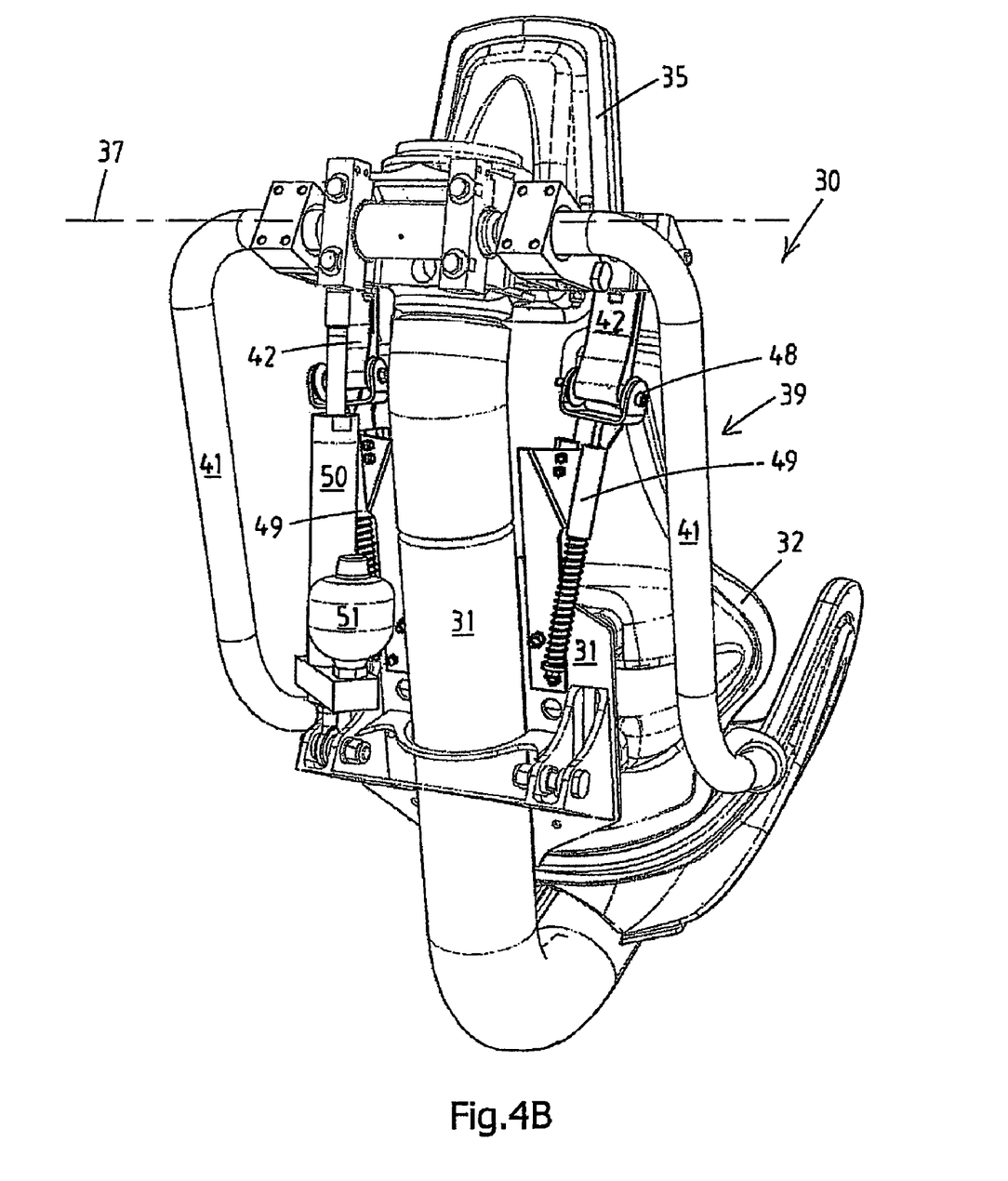
FIG. 4b shows a rear perspective view of the fourth embodiment of a seat assembly of an amusement device according to the invention as shown in FIG. 4a, FIG. 5a shows a portion of an exemplary suspended rollercoaster according to the invention in a side view.

In FIGS. 4a and 4b yet another seat assembly 30 according to the present invention is shown, which is connectable to an elongated track via a frame 31. The seat assembly 30 comprises a seat 32, capable of accommodating a passenger (not shown), comprising a seating surface 33, a back support 46 with a back support surface 36, a head rest 35 and lumbar supports 34. The frame 31 comprises a pivot mechanism 31a providing a pivot axis 37 extending behind the head rest 35 at a distance above the seating surface 33, which pivot axis 37 is substantially parallel to the back support 46 and substantially parallel to the seating surface 33.

The seat assembly further comprises a bar construction 39 comprising a hip bar 40 integral with two pivot arms 41, which pivot arms 41 extends substantially perpendicular from the pivot axis 37 to the hip bar 40, and which hip bar 40 extends substantially perpendicular from the pivot arms 41 and substantially parallel to the pivot axis 37.

As visible from FIG. 4b, the bar construction 39 with pivot arms 41 is pivotable about pivot axis 37 from a raised position in which the hip bar 40 is raised from the seating surface 33 to allow a passenger to sit down in the amusement device seat assembly, to a lowered position via an actuator 50, which is preferably an hydraulic or pneumatic actuator 50. Here the actuator is associated with an accumulator 51. Preferably two actuators 50 are provided symmetrically. For reasons of clarity, in FIG. 4b only one actuator 50 is indicated.

In the lowered position the hip bar 40 is in the vicinity of the seating surface 33, so as to extend over the lap of a passenger seated in the amusement device seat assembly 30. At least part of the pivot arms 41 are in the lowered position located behind an imaginary plane that extends tangent and substantially parallel with the back support surface 46.

When lowered, the hip bar 40 (as shown in FIG. 4a) is connected to a locking member 43. From said locking member 43 a belt strap 44 extends to a connection member 45 associated with the seat 32 or with the frame 31. Preferably, the length of the belt strap 44 is adjustable, possibly via a spring mechanism, to adjust the position of the hip bar 40 to the size of the passenger.

The seat assembly further comprises a belt construction 42 connected to the frame 31 behind the back support 46 and to the bar construction 39. Belt construction 42 comprises two shoulder straps 47 connected to hip bar 40 and extending to an adjustable length mechanism 48. This adjustable length mechanism 48 allows for adaptation of the length of the shoulder straps 47 to the size of the passenger (not shown). As is visible from the rear view in FIG. 4b, the adjustable length mechanism 48 of this embodiment comprises a spring 49 connected to frame 31. In the shown embodiment, a single padded foam body harness 52 is provided over the two shoulder straps 47.

The inventive bar construction in combination with the seat belt assembly allows an unobstructed view in forward and sideways direction by the passenger. Also the passenger is free to move his arms. This allows the passenger to experience a great sense of freedom and add to the thrill of the ride along the track. This sense of freedom is further enhanced if the seat assembly is such that there is no support below the seat for the lower legs and feet of the passenger during the ride along the track, so that the lower legs and feet are essentially freely suspended and movable.

Figure 5A:
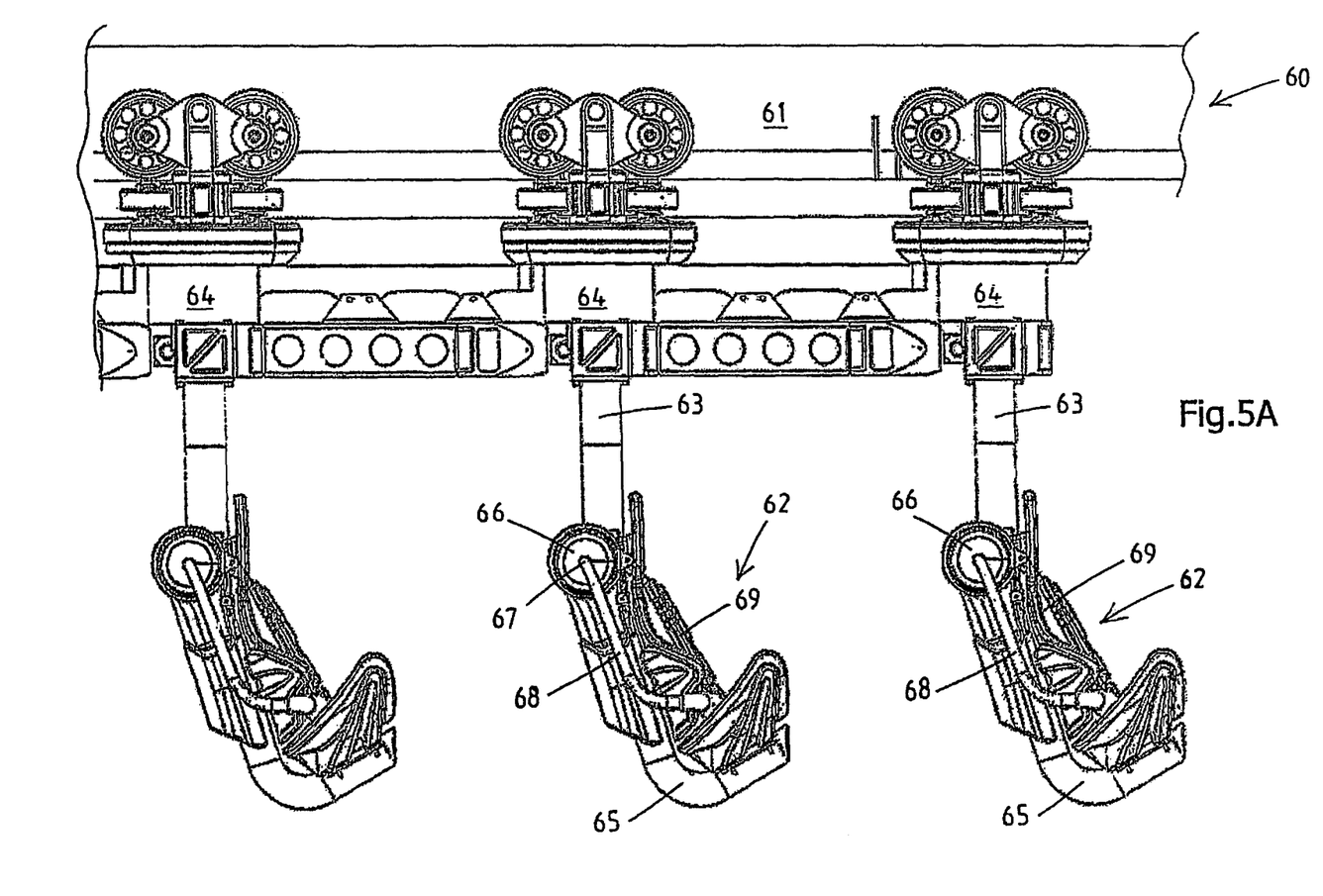
Figure 5B:
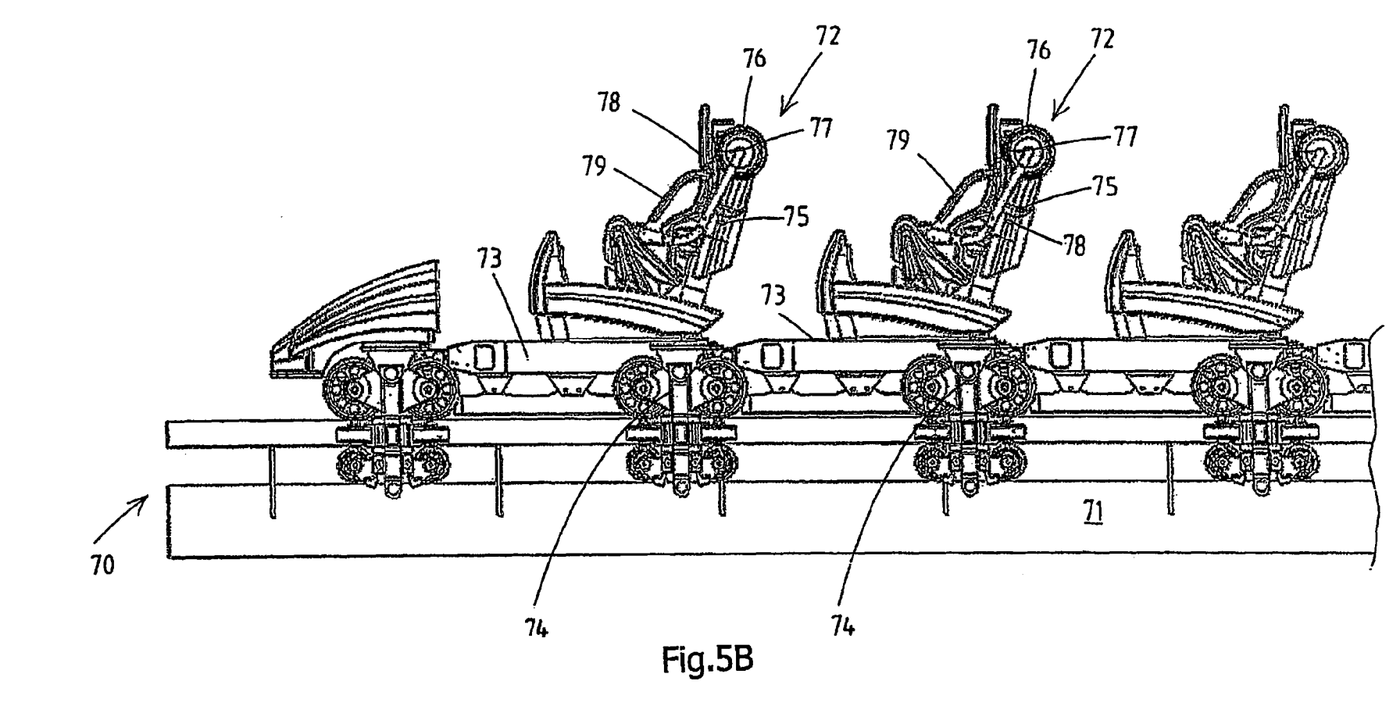
FIG. 5b shows a portion of a rollercoaster according to the invention in a side view.

FIGS. 5a and 5b respectively show a portion of a suspended rollercoaster 60 and of a regular rollercoaster 70 according to the invention. Both amusement devices 60 and 70 comprise an elongated track 61, 71 along which multiple amusement device seat assemblies 62, 72 are moveable. Each seat assembly 62, 72 comprises a frame 63, 73, comprising track engagement means 64, 74 and supporting a seat 65, 75, capable of accommodating a passenger. As is preferred, and common, each track engagement means includes one or more sets of rollers that engage on the track.

Frame 63, 73 further comprises pivot mechanisms 66, 76, providing pivot axes 67, 77 extending behind the seats 65, 75. The seat assemblies 62, 72 shown in FIGS. 5a and 5b are designed similar to what is shown in FIGS. 4a and 4b in an enlarged view, with bar constructions 68, 78 and belt constructions 69, 79.

Figure 6:
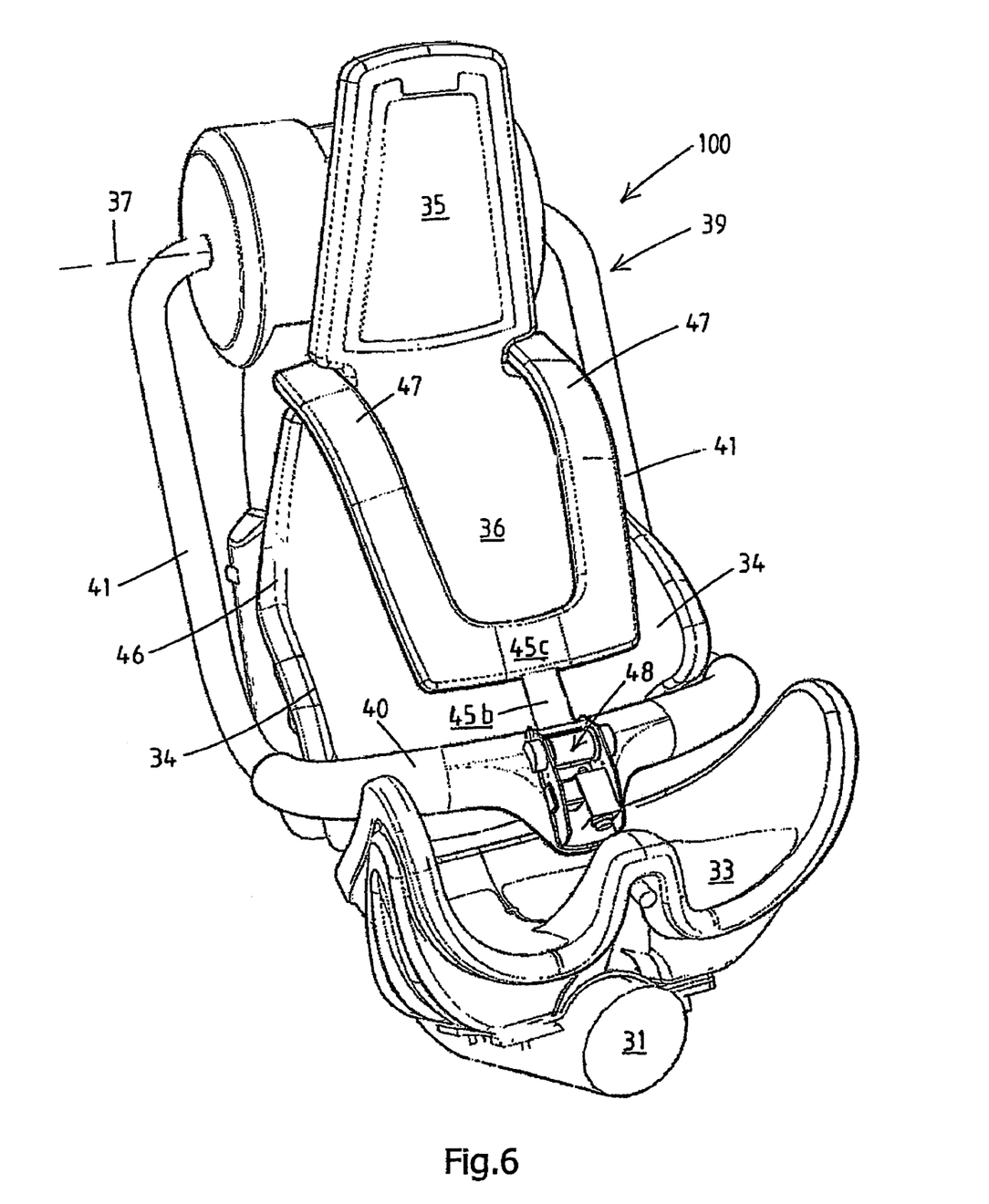
FIG. 6 shows a fifth embodiment of a seat assembly of an amusement device according to the invention.

In FIG. 6 a seat assembly 100 is shown, wherein parts corresponding to or similar to parts in the seat of FIG. 4 have been denoted with the same reference numerals. The seat assembly 100 shown here is designed for a suspended rollercoaster as in FIG. 5a. The seat assembly 30 comprises a seat 32, capable of accommodating a passenger (not shown), comprising a seating surface 33, a back support 46 with a back support surface 36, a head rest 35 and lumbar supports 34. The frame 31 comprises a pivot mechanism 31a providing a pivot axis 37 extending behind the head rest 35 at a distance above the seating surface 33, which pivot axis 37 is substantially parallel to the back support 46 and substantially parallel to the seating surface 33.

The seat assembly further comprises a bar construction 39 comprising a hip bar 40 integral with two pivot arms 41, which pivot arms 41 extends substantially perpendicular from the pivot axis 37 to the hip bar 40, and which hip bar 40 extends substantially perpendicular from the pivot arms 41 and substantially parallel to the pivot axis 37.

The seat assembly further comprises a belt construction of a design which differs from the design shown in FIG. 4A. The belt construction 42 comprises two shoulder straps 47 that are anchored at their upper end to frame 31 or the back support 46. The lower ends of the shoulder straps are connected to a common transverse member 45c. This member 45c is connected to a belt strap 45b, which connects to an adjustable length mechanism 48 fitted on the hip bar 40. This adjustable length mechanism 48 allows for adaptation of the effective length of the assembly formed by shoulder straps 47, member 45c and the belt strap 45b to the size of the passenger (not shown). In the shown embodiment, as is preferred, a single padded foam body harness is provided over the two shoulder straps 47 and the member 45c.

A latch mechanism may be provided to latch the hip bar 40 to the seat, as preferred to a raised portion 33a of the seat extending upwards between the legs of the passenger.

What is claimed is:

1. An amusement device for providing a sense of excitement to one or more passengers using the amusement device, said amusement device comprising a track along which one or more amusement device seat assemblies adapted to carry the one or more passengers are moveable, wherein each seat assembly comprises:
   (a) a seat adapted to accommodate a passenger, the seat comprising a seating surface and a back support with a back support surface;
   (b) a frame comprising track engagement means and being adapted for supporting the seat, the frame further comprising a pivot mechanism providing a pivot axis extending behind the back support surface at a distance above the seating surface, which pivot axis is substantially parallel to the back support and substantially parallel to the seating surface;

(c) a bar construction attached to the pivot mechanism, the bar construction comprising a hip bar and at least a pivot arm integral with the hip bar, wherein the pivot arm is pivotable about the pivot axis from a raised position in which the hip bar is raised from the seating surface to allow a passenger to sit down in the amusement device seat assembly, to a lowered position, wherein in the lowered position of the bar construction, the hip bar is in the vicinity of the seating surface, so as to extend across the hip over the lap of a passenger, and in the lowered position of the bar construction, the pivot arm has a portion that is attached to the pivot axis, extends downwards from the pivot axis and is located behind an imaginary plane that extends tangent to and substantially parallel with the back support surface, such that the bar construction does not obstruct the view of the passenger and does not restrict movements of the arms of the passenger, thereby allowing the passenger to experience a great sense of freedom, (d) a belt construction comprising at least two shoulder straps of which the lower end is connected to the bar construction, and further comprising an adjustable length mechanism associated with the shoulder straps to allow for adaptation of the length of the shoulder straps to the size of the passenger in the lowered position of the bar construction such that the shoulder straps are in physical contact with the shoulders and upper part of the body of a passenger seated in the amusement device so as to increase the sense of safety of the passenger.

2. The amusement device according to claim 1, in which the shoulder straps are padded.

3. The amusement device according to claim 1, wherein over the two shoulder straps a single padded foam body harness is provided.

4. The amusement device according to claim 1, wherein the adjustable length mechanism comprises a spring.

5. The amusement device according to claim 1, wherein the adjustable length mechanism is connected to the hip bar, and the shoulder straps extend between the adjustable length mechanism and the back support.

6. The amusement device according to claim 1, wherein the adjustable length mechanism is connected to the hip bar, and the shoulder straps extend between the adjustable length mechanism and the frame.

7. The amusement device according to claim 1, wherein the adjustable length mechanism is connected to the back support of the seat assembly, and the shoulder straps extend between the adjustable length mechanism and the hip bar.

8. The amusement device according to claim 7, in which the position of the connection is adjustable, so that the upper position of the shoulder straps has a variable height.

9. The amusement device according to claim 1, wherein the adjustable length mechanism is connected to the frame, and the shoulder straps extend between the adjustable length mechanism and the hip bar.

10. The amusement device according to claim 9, in which the position of the connection is adjustable, so that the upper position of the shoulder straps has a variable height.

11. The amusement device according to claim 1, wherein the upper end of the shoulder straps is connected to the back support of the seat assembly, and the adjustable length mechanism is provided in an intermediate portion of the shoulder straps.

12. The amusement device according to claim 11, in which the position of the connection is adjustable, so that the upper position of the shoulder straps has a variable height.

13. The amusement device according to claim 1, in which the back support of the seat is provided with a lumbar support.

14. The amusement device according to claim 1, wherein the seat further comprises a headrest.

15. The amusement device according to claim 1, wherein the amusement device seat assemblies are suspended below the track and a support for the lower legs and feet is absent so that the passengers lower legs and feet are freely suspended to enhance the sense of excitement.

16. The amusement device according to claim 1, wherein a carrier comprising one or more amusement device seat assemblies is movable along the track.

17. The amusement device according to claim 1, wherein the seat further comprises a lumbar support extending from a lateral side of the back support surface, and wherein in the lowered position of the bar construction the pivot arm has a first portion located at a same position in a vertical direction as the lumbar support and the first portion of the pivot arm is located behind a front end of the lumbar support.

18. The amusement device according to claim 1, wherein the seat further comprises a lumbar support extending from a lateral side of the back support surface, and wherein in the lowered position of the bar construction the hip bar extends directly below the lumbar support and extends backward to the pivot arm.

19. The amusement device according to claim 1, wherein the pivot arm is not located directly above the seating surface.

* * * * *